Jan. 4, 1966  J. DASTOLI ET AL  3,227,399
SAFETY AIRCRAFT SYSTEM

Filed Sept. 16, 1963  4 Sheets-Sheet 1

INVENTORS
LEON J. HALEPAS
JOSEPH DASTOLI
BY WILLIAM DEHNEL

*LeBlanc and Shur*
ATTORNEYS

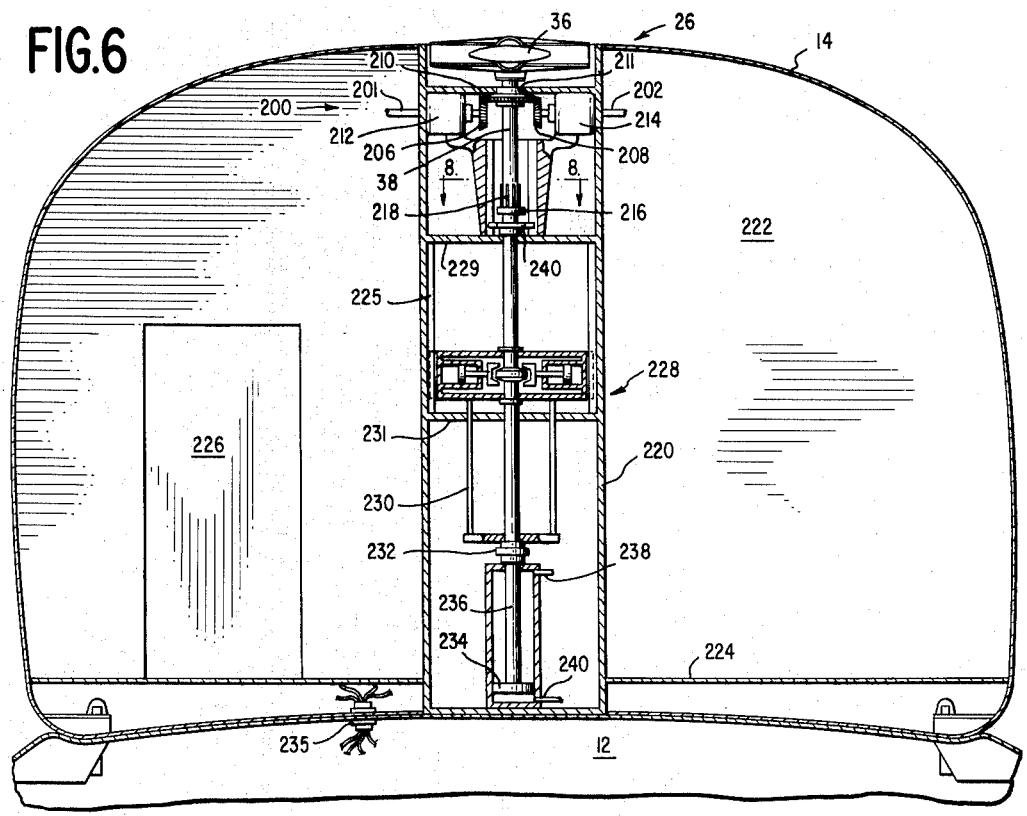
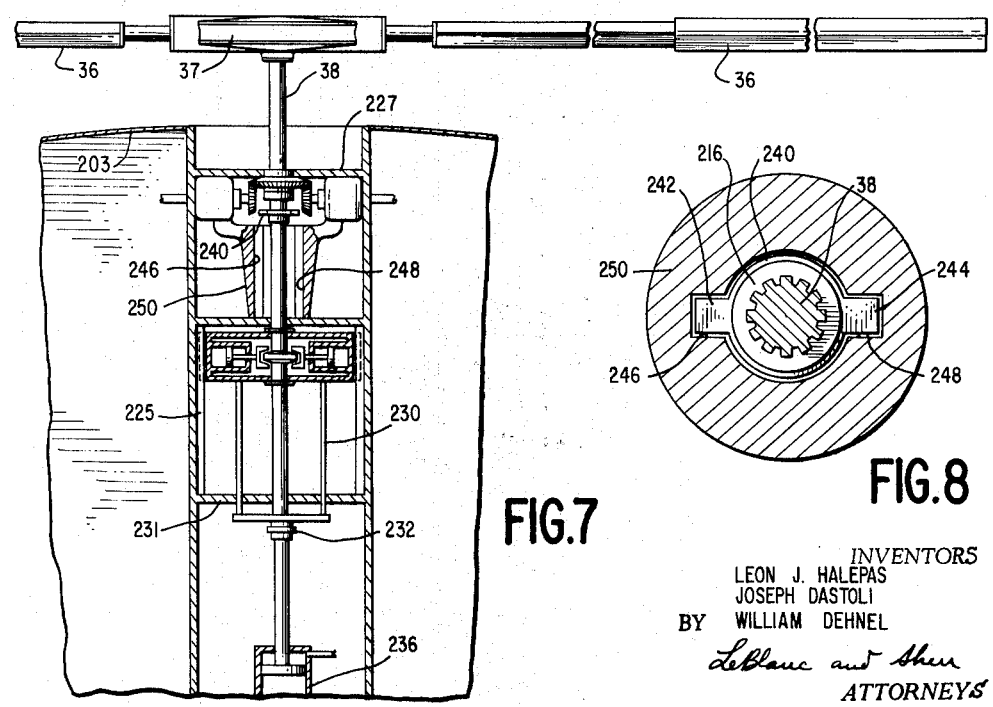

Jan. 4, 1966     J. DASTOLI ET AL     3,227,399
SAFETY AIRCRAFT SYSTEM
Filed Sept. 16, 1963     4 Sheets-Sheet 4
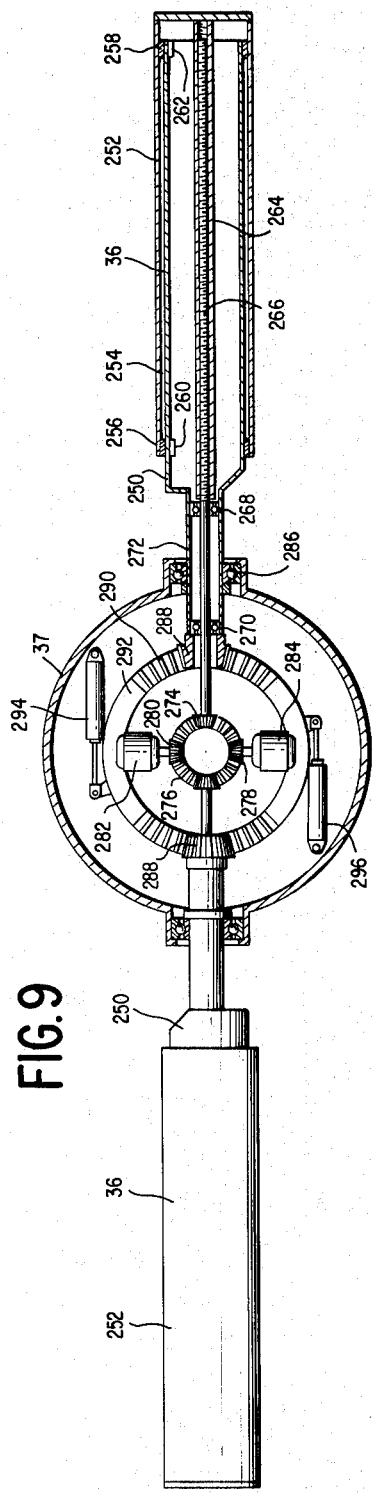
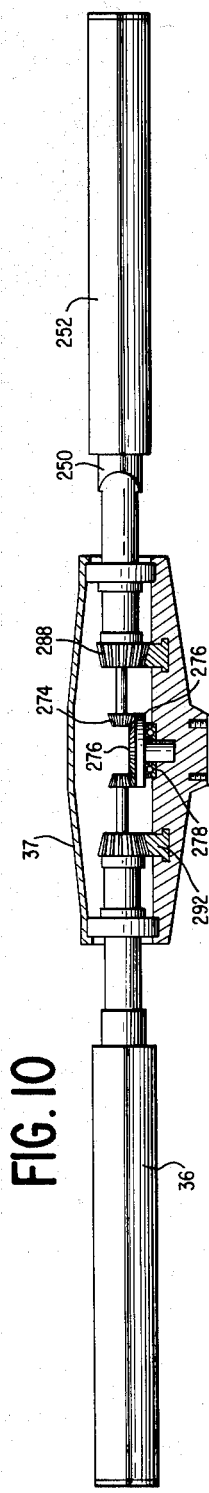
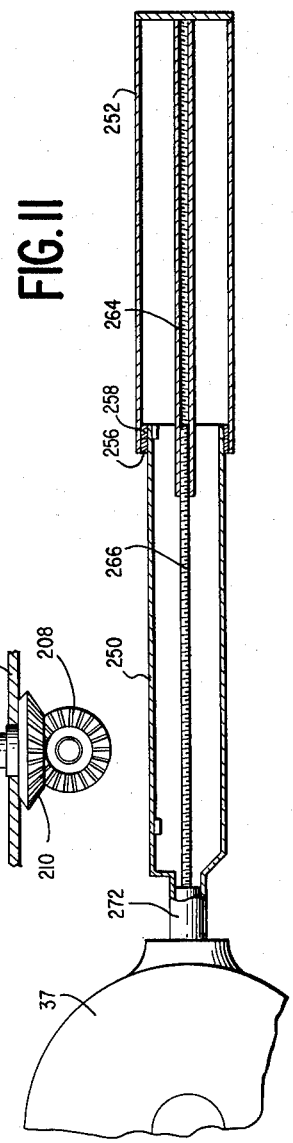
INVENTORS
LEON J. HALEPAS
JOSEPH DASTOLI
BY WILLIAM DEHNEL
ATTORNEYS ён
United States Patent Office 3,227,399
Patented Jan. 4, 1966

3,227,399
SAFETY AIRCRAFT SYSTEM
Joseph Dastoli, 65 Yales Cleres Road; William Dehnel, 14 Vale Ave.; and Leon J. Halepas, 412 W. Main St., all of Meriden, Conn.
Filed Sept. 16, 1963, Ser. No. 308,936
4 Claims. (Cl. 244—2)

This application is a continuation-in-part of copending application Serial No. 175,134, filed February 23, 1962, now abandoned.

This invention relates to aircraft and more particularly to aircraft equipped with a detachable compartment which is provided for the purpose of saving the lives of the occupants by detachment of the compartment upon eminent crash of the aircraft. The divorcee aircraft of the present invention is also useful for military and other applications wherein a long-range high speed carrier may be used to deliver a low-speed or short-range troop transport or passenger compartment to its destination or target.

As is well known, despite continuous and comprehensive safety measures, aircraft accidents each year cause a disastrous loss of lives and property. As one approach to an alleviation of this problem, numerous attempts have been made to provide an auxiliary emergency support system for the aircraft and for devising a workable escape compartment for the crew and passengers. However, while these prior systems have provided some relief in the case of the ejection of individual pilots in military aircraft, no satisfactory solution has ever been achieved in relation to passenger aircraft.

One of the earliest attempts at producing a detachable safety compartment for returning the aircraft, crew and passengers safely to the earth utilized a parachute member which supported the compartment as it descended. Even though a parachute return system of this type is presently being used with some success with relation to single pilots in military aircraft, such systems have never been adopted in the commercial passenger aircraft field, where relatively large and heavy compartments are involved and where the landing must be as gentle as possible. This inability of the parachute system to assure a relatively gentle or soft landing is primarily due to the fact that there is no known way to control either the rate or direction of descent to any appreciable extent. Thus there is no way of showing the rate of descent if it should be too rapid or, more important, picking the type of terrain that would assure the best and safest landing of the compartment.

In an effort to eliminate at least a portion of the difficulty associated with the parachuate method of lowering compartments and disabled aircraft to the ground, a second method of permitting a somewhat controlled descent of an object was proposed and tested. This method utilized a free-wheeling propeller rotor blade attached to the aircraft which, as is well known in the helicopter field, checked the descent of the aircraft to a limited extent and added the desirable feature of a controlled descent in that at least the direction of descent could be manipulated within certain restricted limits by varying the pitch and tilt of the propeller. This proposed propeller system still left much to be desired since the rate of descent was normally too great for a safe landing, the limited control of the free-wheeling propeller was insufficient to insure any degree of choice as to where or in what manner the aircraft would finally contact the earth, and the propellers were subjected to damage or destruction when extended from the aircraft while the aircraft was moving at its normal speed.

Yet a third descent system was proposed in which both the parachute and propeller systems were combined with the thought in mind that this combination would give a slower descent for the entire aircraft. This combined system, however, proved to be only slightly more desirable than either of the prior proposed systems operating alone. Thus, in an attempt to increase the control of the descent of the aircraft as it neared the ground, a drive system was connected to the propellers.

Such a combined system with a motor driven propeller created practically as many problems as it solved. For example, the support mechanism was extremely bulky and often heavy, thus greatly limiting its use. Furthermore, there was a tendency for the parachute to foul the propellers which resulted in their being rendered useless and the compartment falling out of control. Even when such a system functioned properly, a very great danger still existed that an accident would occur upon the aircraft striking the ground since all the explosive and dangerous parts of the aircraft, such as the fuel system and motors, were still present and were often ignited by the shock encountered.

A further type of descent system, such as described in U.S. Patent 2,497,590, proposed the use of an auxiliary power plant and propeller system which would be sufficiently large to support the complete weight of the entire aircraft should the main power plants fail. As a practical matter, it has been found that this cannot be done on larger aircraft since a system of the necessary weight capacity is presently impossible to construct. Even on small aircraft, it is economically unwise to place a motor and propeller system of this power capacity aboard since it occupied too much space and is prohibitive from a weight standpoint. In addition to this, no practical manner has been found to place the motor in operation above the aircraft as proposed, due to the extreme speed and other conditions existing in and about the aircraft in flight.

According to the present invention it has been found that a practical and operative solution to the above enumerated problems can be attained by utilizing an escape compartment having its own independent helicopter type supporting system which is capable of either (1) supporting a portion of the total weight of the aircraft or (2) all the weight of the compartment in sustained, controlled flight. This compartment is attached to the carrier unit portion of the aircraft by a novel clamping arrangement that assures a fast and positive release of the compartment only when the aircraft is moving at a safe speed. Additional important features of the present invention include an extendable helicopter propeller system housed in the passenger compartment, a retractable anti-torque tail rotor, and a novel telescoping rotor and pitch control arrangement.

Accordingly, a primary object of this invention is to provide an aircraft with a detachable compartment equipped with an independent supporting system for sustained controlled flight.

Another object of the invention is to provide an aircraft with an detachable compartment equipped with an independent supporting system that is capable of supporting a portion of the total weight of the aircraft or all of the weight of the compartment in sustained controlled flight.

Another object of the invention is to provide an aircraft with a detachable compartment that can be landed independently of the aircaft.

Another object of this invention is to provide an aircraft with a detachable compartment that can be placed in operation only when the aircraft is flying at a relatively low speed.

Another object of the invention is to provide a detachable compartment for an aircraft utilizing extensible propellers and an auxiliary power plant for sustained flight.

Another object of the invention is to provide an aircraft with a detachable compartment having its own support system which can be used for increasing the lift of the total aircraft.

Another object of the invention is to provide a fast and positive operating clamp for holding a detachable compartment to an aircraft.

Another object of the invention is to provide a safety lock system for a detachable compartment that prevents the separation of the compartment from the aircraft if the aircraft is moving faster than a predetermined speed.

Another object of the present invention is to provide a novel telescoping rotor and pitch control system.

Another object of the present invention is to provide a novel retractable antitorque tail rotor.

These and further objects and advantages of the invention will be more apparent upon reference to the following specification, claims and appended drawings wherein:

FIGURE 6 is a cross section through the extendable and retractable rotor system of the present invention.

FIGURE 7 is a cross section similar to FIGURE 6 showing the rotor in the extended position.

FIGURE 8 is a cross section taken along line 8—8 of FIGURE 6.

FIGURE 9 is a plan view with parts in section showing the telescopic rotor and pitch control of the present invention.

FIGURE 10 is an elevational view with parts in section corresponding to FIGURE 9.

FIGURE 11 is a plan view similar to FIGURE 9 showing the telescopic rotor blade in extended position.

Figure 1:
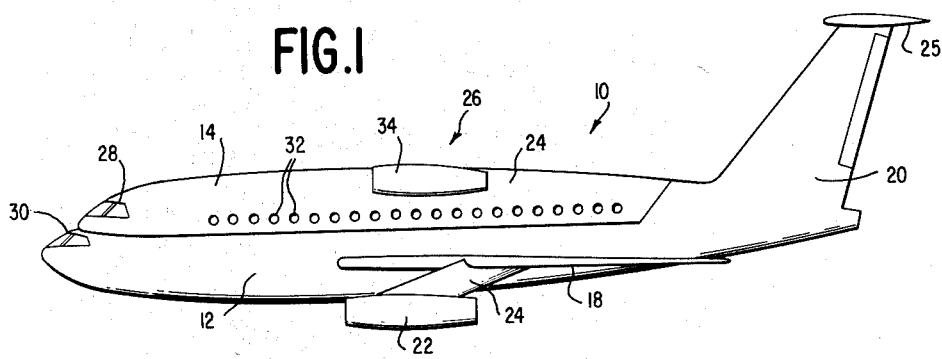
FIGURE 1 is a side elevation of a divorcee aircraft in normal flight having a detachable compartment in accordance with this invention.

With continuing reference to the accompanying drawings, wherein like reference numerals designate similar parts throughout the various views and with initial attention directed to the embodiment of the invention as shown in FIGURE 1 reference numeral 10 is used to generally designate a complete divorcee aircraft constructed in accordance with the present invention. For purposes of this invention, the aircraft is shown of the type presently in use for transporting passengers, although it should be realized that the principle of this invention is readily applicable to other types of aircrafts, such as troop carriers, cargo carriers, and bombers as will be more fully explained hereafter.

As can be seen with reference to FIGURE 1, the aircraft 10 of this invention consists of two main units or sections namely a carrier unit 12 and a detachable compartment or unit 14. The carrier unit 12 of the aircraft as the name implies is utilized for supporting or carrying the total load of the aircraft during normal flight and consists primarily of a main fuselage 16 to which the various lift and control surfaces such as the wings 18 and tail section 20 are attached. The aircraft 10 is provided with one or more jet engines 22 on each wing of the carrier 12 supported from the wing 18 in the usual manner as indicated at 24. Tail section 20 may be provided if desired with short stabilizing wings 26. As is the usual practice in present day passenger aircraft, the fuselage 16 houses the landing gears, kitchen, bathroom, lounge, baggage compartment and the other various rooms and mechanisms that contribute to the comfort and safety of the passengers and crew carried.

The detachable compartment 14 which is preferably made of an aluminum backing over which is placed a suitable plastic material so that a light, strong, watertight compartment is formed, as will be more fully explained later, comprises a passenger compartment 24 including an auxiliary power and propeller area generally indicated at 26, and the pilot cockpit 28. The carrier is preferably provided with a similar pilot cockpit 30 having the required set of controls.

The interior of the passenger compartment is provided with the customary windows 32 and seats (not shown) which are preferably constructed of a reinforced vinyl or rubber which can be inflated with a light gas such as helium. By using such seats, the overall weight of the detachable compartment 14 is further reduced without any sacrifice in the comfort or safety of the passengers.

Secured to each side of the passenger compartment 14 by a short wing is an auxiliary propulsion unit or motor 34 preferably in the form of a gas turbine engine. The engines 34 are connected by suitable engine bleed drive couplings as more fully explained below to a pair of retractable telescoping helicopter blades 36. These blades are driven from a vertical shaft 38 which may be retracted downwardly from the position illustrated in FIGURE 2 to that illustrated in FIGURE 1 so as to be preferably covered by a suitable hydraulically operated closable door. A retractable antitorque mechanism 40 including antitorque propeller 42 telescopes into the rear of the passenger compartment 14.

Figure 3:
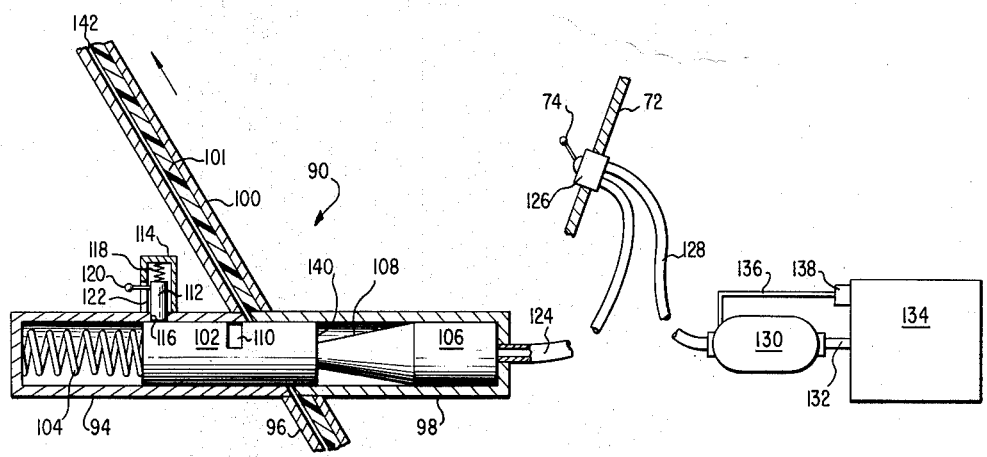
FIGURE 3 is a high speed hydraulically operated clamping arrangement of the locking bolt type utilized to secure the detachable compartment to the carrier unit of the aircraft.

The complete detachable compartment 14 is securely held in position on the carrier unit 12 by a plurality of quick and positive acting release clamp assemblies, generally indicated at 90 in FIGURE 3 which are operated by a lever 74 mounted on the pilot's instrument panel 72 in cockpit 28. The embodiment of the release clamp assembly 90 shown in FIGURE 3 consists of a positive and quick operating hydraulic lock arrangement. This hydraulic release clamp consists of a cylinder sleeve 94 having an open end and a closed end, the open end of which is securely mounted through a hole in a fire wall panel 96 on the carrier portion 12 of the aircraft by any suitable means, such as welding. A second cylinder sleeve 98 having an open end and a closed end is similarly secured through a hole in the aluminum fire wall 100 so that the sleeves 94-98 are aligned with one another along their longitudinal axes. The plastic layer that completely covers the outer surface of the detachable compartment is shown at 101 between the fire walls 96 and 100.

Mounted within the sleeve 94 is a locking bolt type piston 102 that is slidable in a longitudinal direction within the sleeves and is normally pressed to the right by a coiled spring 104. Slidably mounted within the second sleeve 98 is a hydraulic piston 106 which has a tapered end portion 108 that is engaged and normally pushed to the right by the locking bolt 102 as shown. An aperture or slot 110 is formed in the locking bolt 102 for receiving a catch bolt 112 which is held in a housing 114 located over a hole 116 in the sleeve 94. This catch bolt 112 is biased against and rides upon the surface of the locking bolt by a spring 118. A manual release handle 120 is shown connected to the bolt 112 through a slot 122 in the housing 114 for releasing the locking bolt once it drops into the apertures 110, should that be desirable.

A hydraulic line 124 is shown connected between the second sleeve 98 and the output of an operating hydraulic valve 126 mounted on the instrument panel 72 in the pilot's compartment. The input opening of the valve 126 is connected through a hydraulic line 128 to a pumping unit 130 which may be of any suitable type such as, for example, a gear driven hydraulic pump. This pump is in turn connected through a hydraulic line 132 to an oil reserve 134 while a second hydraulic line 136, which serves as a bypass oil line, is connected between the outlet of the pump and a bypass valve 138 mounted on the tank 134.

The operation of the hydraulic release clamp may be explained in the following manner. When the detachable compartment is to be released from the carrier unit 12 of the aircraft, the hydraulic valve 126 is opened by operating the handle 74 thus permitting the hydraulic fluid from the operating pump 130 to flow through the valve and hydraulic line. This flow of the hydraulic fluid exerts a predetermined force upon the right-hand end of the hydraulic piston 106 which in turn causes the piston to move to the left thereby driving the locking bolt 102 against the pressure of the coil spring 104 until the locking bolt is caught by the catch bolt 112 dropping into the hole 110. When this occurs, the interface 140 between the bolts 102 and 106 are substantially parallel with the interface 142 between the two fire wall members 96 and 100–101 of the carrier and detachable compartments, respectively. As will be apparent, the fire wall member 100–101 is now free to move upward along the fire wall member 96 thereby separating the detachable compartment 14 from the carrier unit 12 of the aircraft.

Should it be desirable to again lock the carrier unit 12 and compartment 14 together, as would be the case where a detachable compartment is being shifted from one carrier unit to another, the sleeves 94 and 98 are aligned and the lever 122 is lifted thereby removing the catch bolt from the hole 110. This permits the coil spring 104 to drive the locking bolt to the right into its locked position so that the fire walls 96 and 100–101 are no longer free to move relative to one another.

Figures 4, 5:
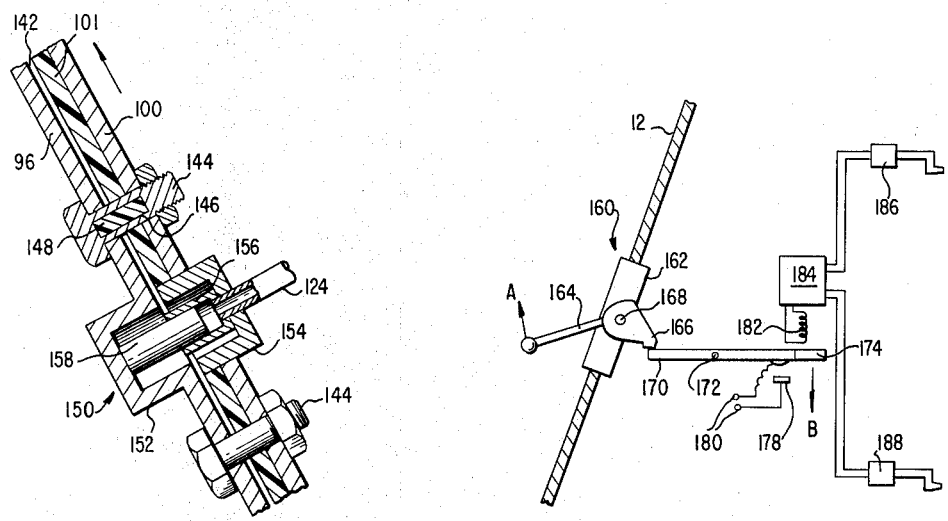
FIGURE 4 is a second type of hydraulically operated clamping arrangement utilizing a plurality of shear bolts for securing the detachable compartment to the carrier unit of the aircraft.
FIGURE 5 shows a safety control system for operating the detachable compartment clamping arrangements when the aircraft is moving at a predetermined low air speed.

A second type of release clamp assembly is shown in FIGURE 4 in which a plurality of specially designed shear bolts 144 are utilized to clamp the two fire walls 96 and 100–101 together. The shear bolts 144 of this embodiment comprise a first outer safety jacket 146 of steel or other suitable metal, inside of which is a cavity filled with a hard plastic material 148. This type of bolt has a relatively high resistance against shearing in a transverse direction since the plastic core adds to the strength of the jacket but is readily sheared by a pressure applied along its longitudinal axis, since the plastic cannot grip the inner walls of the cavity and thus adds no resistance to the jacket being pulled apart.

To apply a shearing force along the longitudinal axis of the bolt, a hydraulic piston arrangement 150 is positioned between two recesses 152 and 154 formed in the fire walls 96 and 100–101, respectively. This hydraulic arrangement consists of a cylinder 156 inside of which is slidably mounted a piston 158. Both the end of the cylinder 156 and piston 158 rest securely against the surface of their respective recesses 152 and 154 so that any moving apart of the cylinder and piston will force the fire walls 96 and 100–101 apart. The hydraulic line 124 is connected between the cylinder 156 and a suitable valve controlled hydraulic pump system such as the one shown in FIGURE 3.

As is readily apparent, once the valve controlling the hydraulic fluid is opened, the cylinder 156 and piston 158 will be forced apart thereby applying a longitudinal pressure to the bolts 144 which is sufficient to shear these bolts at their relatively weak middle portion. Once the bolts are sheared, the two fire walls 96 and 100–101 are no longer clamped together and fire wall 100–101 will be free to move up along the tapered surface formed by the interface 142.

Obviously, other types of clamps could be used to hold the detachable compartment 14 to the carrier unit 12 of the aircraft as long as they operate in a positive and quick manner.

Figure 2:
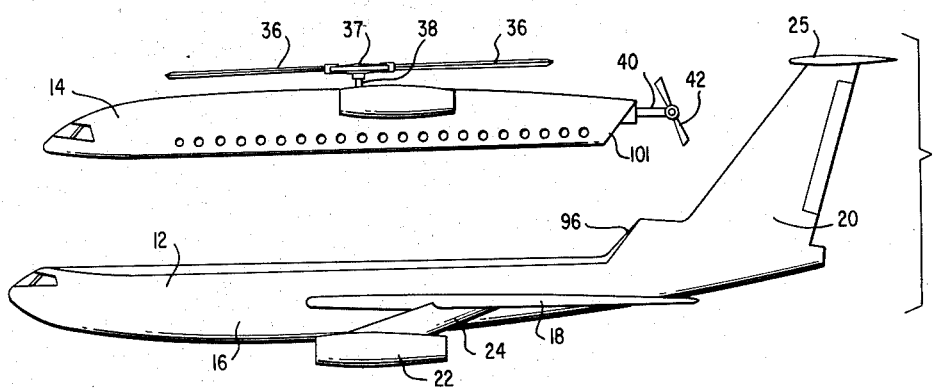
FIGURE 2 is an exploded view showing the separation of the compartment from the carrier.

The overall operation of the carrier unit 12 and detachable compartment 14 can best be understood by referring to FIGURES 1 and 2. Assuming that some emergency exists such as a complete power failure of the carrier power plants 22 which renders the carrier 12 incapable of supporting the total weight of the aircraft in sustained flight and this fact is realized by the pilot, it is determined that the carrier unit 12 should be sacrificed for the lives of the passengers and crew. Once this decision has been made to separate the carrier unit 12 from the detachable compartment 14 the aircraft is slowed down by any means, such as by placing it in a slight climb until its air speed is only slightly above its stalling speed. This slow flight of the aircraft permits the helicopter type blades 36 to be extended from the compartment 14 and placed in operating condition without being subjected to high velocity air pressures as would be produced if the aircraft were flying at high speed. This is important since a high pressure upon the relatively long and somewhat fragile blades would result in their being damaged or completely destroyed. One method of assuring that the proper flight speed has been attained before the blades are extended from the compartment is to use a speed indicator safety lock such as is shown in FIGURE 5.

The speed indicator safety lock of FIGURE 5 is indicated generally at 160 and consists of an actuating switch arrangement 162 made up of a lever 164 connected to a catch 166 which pivots about a point 168 when the lever is raised. A bell crank 170 is pivotally mounted at 172 and is normally kept from rotating by the catch 166 resting upon the top left end of the bell crank. A weight 174 is mounted on the extreme right-hand end of the bell crank and, due to gravity, tends to rotate the bell crank against the catch 166. Also mounted intermediate the pivot point 172 and the weight 174 of the bell crank is an electrical contact point 176 which is positioned above a second contact point 178 so that once the bell crank is rotated downward by the weight 174, the two contact points will close and thus complete a circuit through the output terminals 180.

Positioned just above the metal weight 174 is an electromagnet type solenoid 182 which, during normal flight of the aircraft, exerts a magnetic force upon the weight and thus tends to pull it upward. The solenoid is in turn connected to a control circuit 184 of a double electromagnetic type which furnishes electric power to the solenoid as long as either the left or right wing air speed stall indicators 186 and 188, respectively, indicate that the aircraft is moving at a predetermined speed greater than the stalling speed of the aircraft.

The operation of the speed indicator safety lock is readily apparent in that movement of the lever 164 upward in the direction indicated by the arrow A causes the catch 166 to slide clear of the top left end of the bell crank 170 thus freeing it for rotation about the pivot point 172. As long as the speed of the aircraft is a predetermined amount above the stalling speed, the air speed stall indicators 186 and 188 will continue to activate the double electromagnet circuit 184 which in turn will activate the solenoid 182. The electromagnetic field produced by the solenoid will in turn hold the weight 174 in its present position thus keeping the contact points 176 and 178 open.

When the air speed indicated by the stall indicators 186 and 188 reaches a predetermined rate at which the helicopter blades 36 can operate correctly without danger of damage due to high velocity air pressures, the double circuit 184 will deenergize the solenoid 182 thereby letting the bell crank 170 pivot about the point 172. The movement of the bell crank in the direction of the arrow B closes the contact points 176 and 178 thus energizing the circuit connected to the terminals 180. Obviously, various circuits may be connected to these terminals 180 such as, for example, a door opening circuit which opens the door 203 (see FIGURE 7) so that the helicopter blades 36 can be moved up and telescoped out. It has also been found advantageous to connect the starting circuit (not shown) for the auxiliary power plants 34 to the terminals 180 so that the power plants will start automatically.

FIGURES 6, 7 and 8 illustrate the drive for the retractable rotors 36. A pair of drive shafts 201 and 202 provide a mechanical blade bleed input from the auxiliary power plants 34 in a conventional manner to a transmission generally indicated at 200 comprising a pair of bevel gears 206 and 208 which engage a mating gear 210 rotatably mounted on support bearing 211 and through which shaft 38 moves. The gears 206 and 208 are coupled to the bleed-in shafts 201 and 202 by hydraulic clutches 212 and 214. The transmission unit also includes a thrust bearing 216 rigidly secured to the shaft 38 and movable upwardly therewith from the retracted position illustrated in FIGURE 6 to the extended position illustrated in FIGURE 7. The upper end of the thrust bearing 216 is splined as at 218 to engage mating serrations on the lower end of gear 210.

The movable shaft 38 is mounted in a tubular support 220 approximately one foot in diameter provided with transverse partitions 227, 229 and 231 and in turn supported by a partition 222 passing transversely through the interior of the compartment 14 and mounted on the floor 224. A suitable doorway 226 is provided through the partition to permit passengers to pass therethrough. A break away connector 235 provides for the various electrical connections between sections 12 and 14. Also mounted within the tubular support 220 is a movable hydraulic brake 228 movable upwardly and downwardly with the shaft 38 in a track 225 by means of a yoke 230 actuated by a double thrust bearing 232. A hydraulic piston and cylinder 234 and 236 is coupled to the lower end of the shaft 38 and provided with input and output hydraulic lines 238 and 240 to actuate the piston.

Also provided in the transmission 200 is a locking ring 240 rigidly secured to the shaft 38 as best seen in FIGURE 8 and this ring is provided with a pair of oppositely extending tabs 242 and 244 adapted to be received in and engaged by corresponding slots or grooves 246 and 248 provided in support casing 250 when the rotor is retracted.

FIGURES 9, 10 and 11 illustrate the telescopic nature of the helicopter blades and show the blade pitch control structure. Since the rotors 36 are of similar construction only a single blade is described in detail. Each blade comprises an inner member 250 telescoped within an outer member 252 which outer member is slidable on a track 254 formed integral with the inner member 250. A pair of stop switch contacts 256 and 258 engage similar contacts 260 and 262 on inner element 250 to limit the inward and outward movement of outer element 252.

Outer blade element 252 also includes a central internally threaded tube 264 threadly receiving a screw 266 which, upon rotation, moves the outer element 252 from the retracted position of FIGURE 9 to the extended position of FIGURE 11 and back. Screw 266 is mounted in antifriction bearings 268 and 270 formed in blade root 272. The rear end of the screw 266 carries a bevel gear 274 engaging a mating bevel gear 276 rotatably mounted in the rotor 37 on antifriction bearings 278. Bevel gear 276 is rotated by a pair of smaller bevel gears 278 and 280 carried by the output shafts of a pair of electric motors 282 and 284 mounted in the rotor.

The root 272 of each blade is supported by a blade thrust bearing 286 and carries at its inner end a bevel gear 288 engaging the teeth 290 of an annular rack slidable in the rotor 37. The rack 292 is rotated in the rotor 37 by means of a pair of hydraulic cylinders indicated at 294 and 296.

Figure 12:
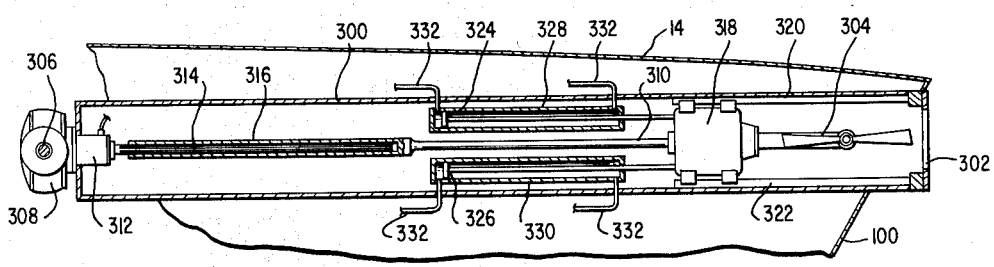
FIGURE 12 is an elevation with parts in section showing the novel, extendable and retractable, antitorque tail rotor of the present invention.
Figure 13:
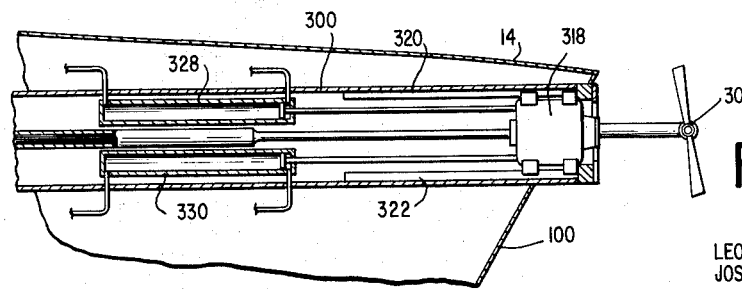
FIGURE 13 is a view similar to FIGURE 12 showing the antitorque rotor in extended position.

FIGURES 12 and 13 illustrate the retractable antitorque tail rotor of the present invention. This unit comprises a tubular housing 300 in the rear end of the passenger compartment 14 having a rear opening 302 through which is adapted to pass the tail or anti-torque rotor blade 304. A pair of engine bleed shafts such as the shaft 306 supply power from the auxiliary power plants 34 to the transmission 308 which is coupled to the tail rotor drive shaft 310 by way of a hydraulic clutch 312. Shaft 310 is of telescopic type construction including a splined stub shaft 314 slidably received into the hollow end 316 of the drive shaft 310 so that the shaft 310 may move relative to the shaft 314. A reduction gearbox 318 is mounted on tracks 320 and 322 in the tubular support 300 and adapted to be moved by a pair of hydraulic pistons 324 and 326 movable in hydraulic cylinders 328 and 330. The hydraulic pistons and cylinders as illustrated are provided with the usual inlet and outlet hydraulic lines 332.

In operation, with the auxiliary power plants 34 started and in a standby state, door 203 in FIGURE 7 is opened and the hydraulic piston and cylinder 234 and 236 shown in FIGURE 6 actuated to raise the drive shaft 38 and elevate the helicopter blades from the position shown in FIGURE 6 to the extended position illustrated in FIGURE 7. Once the blades are projected upwardly through the door 203 the electric motors 282 and 284 of FIGURE 9 are energized to cause the telescoping blades to extend outwardly to full length. When this has been accomplished the hydraulic clutches 212 and 214 of FIGURE 6 are closed and power is applied to the blades to cause them to rotate under the influence of the auxiliary power plants 34. Power is applied from the power plants 34 to bring the helicopter blades up to full speed at which time the correct pitch of the blades is set by actuation of the hydraulic cylinders 294 and 296 in FIGURE 9.

Once the helicopter blades are in proper operating condition, the pilot may operate the lever 74 which in turn activates the release clamp arrangement 90 thereby freeing the detachable compartment 14 from the carrier unit 12. Once the detachable compartment 14 is free it is lifted by the helicopter blades away from the carrier unit 12 substantially in the manner illustrated in FIGURE 2.

As pointed out above, the various controls and instruments of the aircraft are provided with detachable coupling units so that they may readily drop away with the carrier unit 12. The tapered surface formed by the interface of the fire walls 96 and 101 also serves to assure a fast and smooth separation of the compartment interior unit since the compartment 14 will more or less slide up along the surface of the fire wall 96 until it clears the top of the aircraft fuselage.

Once the detachable compartment 14 is clear of the carrier unit 12 the compartment 14 is then self-sustaining and may be flown to a desired landing spot. At this time the locking ring 240 is in a position to rotate free of the grooves in casing 250. The carrier unit 12 can be remotely controlled from the compartment 14 through a radio control unit if desired so it can be guided to a remote area and destroyed while still in flight and well above the ground, thus minimizing the danger of extensive damage which might result from the carrier unit uncontrollably hitting the ground. In order to assure a safe landing for the passenger compartment 14 on the ground with a minimum amount of damage, a skid-type landing gear may be mounted on the under surface. Similarly a screw and rudder arrangement may be provided for use in the event that the pilot chooses to land the compartment which as described is provided with a waterproof plastic layer in a body of water. Since the cockpit of the passenger compartment 14 is fully equipped with all navigational instruments and radio equipment contact with rescue or other groups is readily maintained and the exact location of the compartment may always be known.

Should the auxiliary power plants 34 fail, suitable electrical storage batteries may be provided to actuate the pitch control hydraulic cylinders so that the helicopter blades may be suitably pitched for auto rotation to thus lower the compartment to the ground in a safe manner.

It should be pointed out that the helicopter blades 36 can also be used to sustain a portion of the total weight of the aircraft during ascent or descent and even during temporary power failure of one or all of the outboard carrier power plants 22. To operate these helicopter blades in such a manner as to lift a portion of the total weight of the aircraft it is only necessary that the release clamp arrangements 90 be left unactuated while the blades are controlled in a normal manner. Of course, the auxiliary power plants 34 and blades are not capable of carrying the total weight of the combined aircraft 10 in sustained flight but by using this additional lift a faster ascent and slower descent of the aircraft is possible while the additional lift during an emergency will give the pilot the necessary time and control of the aircraft that may be required to prevent loss of the aircraft.

This faster ascent and slower descent of large aircraft also permits the use of a considerable number of additional airports which cannot now be used by such aircraft due to long runway requirements. The only limitation upon the use of the helicopter blades for additional lift during take-off, landing or in flight is that the blades be retracted before sufficient speed is attained by the aircraft to result in the blades being damaged by excessively high air velocities. To assure that the blades are retracted prior to this speed being reached a control circuit somewhat similar to that shown in FIGURE 5 but operating in a reverse manner may be included in the aircraft. Since the detachable compartments 14 may be identical as may be carrier units 12, the various compartments and carrier units can be interchanged. This feature is especially advantageous since fewer detachable compartments are required than carriers, since some of the carrier units are normally undergoing maintenance and overhaul at any designated time.

It will also be readily apparent that even though the present invention has been described in relation to providing safety and auxiliary lift features in commercial passenger aircraft various other uses of the present invention exist. For example, by providing the duplicate controls in cockpits 28 and 30, it is possible to permit the carrier to be flown back to its base so that a military aircraft is provided which can land a full fighting force intact with a radio equipped point from which to operate. By the use of the high speed carrier unit for carrying the detachable compartment to the battle area, the fighting force can be deployed faster and more safely than by use of helicopters or paratroops as is now the practice. Furthermore, it is also possible for the detachable compartment to rendezvous with and reattach itself to the carrier unit in flight after the military mission is accomplished for a speedy and safe return to the operating base.

In the preferred embodiment of the invention the top section controls and systems are completely independent of the similar systems in the lower carrier section. The bottom section carrier controls and systems are also independent of the upper section except for the following. The pilots radio plug-in from the lower section to the upper section for engine synchronization is desirable along with a plug-in for hydraulic pressure feed to the upper section from the carrier's supply and an additional plug-in from the lower to upper sections for fueling purposes if necessary. The above plug-ins can be either manually or automatically controlled and broken by the pilot in the compartment section. Both sections should preferably be separately pressurized and the lower carrier section should contain a full instrument panel while the upper passenger compartment preferably should contain only the required instruments for short haul landings or for military purposes as required. For safety purposes, it is desirable to provide a sliding door between the two cockpits 30 and 28 so that the pilots or other crew normally present in the carrier 12 may quickly pass to the passenger compartment 14 in the event of an emergency in the carrier unit when separation of the two units is seen to be imminent.

It is apparent from the above that the present invention provides a novel divorcee type aircraft having two separate flyable sections—one of the long-range high-speed type and the other of the short-range low-speed type—which not only form their separate functions both for passenger safety and for military tactics, but also complement each other during normal operation of the combined aircraft. Important features of the present invention involve an automatic latch arrangement, an extensible and retractable rotor, a variable pitch drive for the rotor and a novel extensible antitorque rotor for the separable passenger compartment. Through this arrangement the helicopter range is modified to become effectively that of a jet airliner. At the same time the additional lift provided by the auxiliary propulsion units greatly increases the operating safety and maneuverability of the combination.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a helicopter, a retractable antitorque rotor assembly comprising a compartment in the rear of said helicopter, blade drive means operatively coupled to said compartment, a telescoping drive shaft extendable through an opening in said compartment, rotary blade means carried by said drive shaft, means coupling said blade drive means to said telescoping drive shaft, and hydraulic means for extending and retracting said drive shaft.

2. Apparatus according to claim 1 including a gear box coupled to said drive shaft and slidably mounted on tracks in said compartment, and a pair of hydraulic pistons for moving said gear box along said tracks to extend and retract said drive shaft.

3. An aircraft comprising an aircraft carrier unit having a fuselage, wing means secured to said fuselage for supporting said carrier unit in normal flight, high-speed jet-type power plant means located on said carrier unit for propelling said carrier unit in flight, detachable compartment means, said compartment means being supported by and releasably locked to said carrier unit, said carrier unit and compartment means having complementary configurations which when locked together form a single unitary streamlined fuselage for the aircraft, means for releasing said compartment means from said carrier unit, power means connected to said compartment means, and means driven by said power means for supporting said compartment means in sustained controlled flight when said compartment means is released from said carrier unit, said means driven by said power means comprising a variable-pitch helicopter blade arrangement movable from a low-speed vertical-thrust position to a high-speed position in which said blade arrangement presents a minimum aerodynamic resistance to horizontal flight.

4. An aircraft according to claim 3 wherein said detachable compartment means includes a pilot compartment of said aircraft.

(References on following page)

References Cited by the Examiner

UNITED STATES PATENTS

| | | | |
|---|---|---|---|
| 1,672,163 | 6/1928 | Krammer | 244—2 |
| 2,130,918 | 9/1938 | De Stefano | 244—17.19 |
| 2,464,285 | 3/1949 | Andrews | 244—7 |
| 2,497,590 | 2/1950 | Drill | 244—139 |
| 2,523,651 | 9/1950 | Doussain | 170—160.48 |
| 2,563,731 | 8/1951 | Masterson | 244—2 |
| 2,585,030 | 2/1952 | Nosker | 244—2 |
| 2,715,447 | 8/1955 | Kelson | 170—160.48 |
| 2,749,059 | 6/1956 | Meyers et al. | 244—7 |
| 2,797,881 | 7/1957 | Andrews | 244—2 |
| 2,934,294 | 4/1960 | Faibusch | 244—139 |
| 3,065,940 | 11/1962 | Eckstein | 244—130 |
| 3,070,326 | 12/1962 | Griffith | 244—2 |

MILTON BUCHLER, *Primary Examiner.*

FERGUS S. MIDDLETON, *Examiner.*

R. G. BESHA, A. E. CORRIGAN,
*Assistant Examiners.*